United States Patent [19]

Baranowski

[11] Patent Number: 5,454,465
[45] Date of Patent: Oct. 3, 1995

[54] KICKER CLAMP FOR CONTAINERS

[75] Inventor: John Baranowski, Bensalem, Pa.

[73] Assignee: Campbell Soup Company, Camden, N.J.

[21] Appl. No.: 265,948

[22] Filed: Jun. 27, 1994

Related U.S. Application Data

[62] Division of Ser. No. 878,693, May 5, 1992, Pat. No. 5,355, 991.

[51] Int. Cl.$^6$ ................................................. B65G 47/34
[52] U.S. Cl. .................................... 198/429; 198/430
[58] Field of Search ................................. 198/429, 430, 198/468.1, 468.2, 746

[56] References Cited

U.S. PATENT DOCUMENTS

| | | | |
|---|---|---|---|
| 1,292,178 | 1/1919 | Waterman | 198/436 |
| 1,998,163 | 4/1935 | Meyer | 198/429 |
| 2,092,773 | 9/1937 | Nordquist et al. | |
| 2,487,354 | 2/1949 | McNamara et al. | 198/437 X |
| 2,515,404 | 7/1950 | Grosvenor | 198/415 |
| 2,592,275 | 4/1952 | Grosvenor | 198/625 |
| 2,753,975 | 7/1956 | Day et al. | |
| 2,857,037 | 10/1958 | Breedback | 198/436 |
| 2,923,395 | 2/1960 | Von Hofe | 198/436 |
| 3,072,239 | 1/1963 | Jones et al. | 198/429 |
| 3,178,006 | 4/1965 | Nigerlli et al. | 198/480 X |
| 3,286,619 | 11/1966 | Lee | |
| 3,339,702 | 9/1967 | Novak et al. | 198/411 X |
| 3,403,770 | 10/1968 | Boyce et al. | 198/410 X |
| 3,403,771 | 10/1968 | Gardiner et al. | 198/410 X |
| 3,511,168 | 5/1970 | Pech | |
| 3,545,985 | 12/1970 | Mencacci et al. | 99/363 X |
| 3,547,248 | 12/1970 | Mencacci et al. | |
| 3,575,275 | 4/1971 | Reimers | |
| 3,615,725 | 10/1971 | Bernardus | |
| 3,619,126 | 11/1971 | Carvallo | 99/361 X |
| 3,640,375 | 2/1972 | Reimers | |
| 3,642,111 | 2/1972 | Reimers et al. | 198/429 |
| 3,776,342 | 12/1973 | Kulig et al. | |
| 3,827,211 | 8/1974 | Zavatone et al. | |
| 3,841,946 | 10/1974 | Carter | |
| 3,878,932 | 4/1975 | Reimers | |
| 3,986,832 | 10/1976 | Smorenburg | 422/106 |
| 4,301,912 | 11/1981 | Cooley et al. | 198/625 X |
| 4,496,040 | 1/1985 | Kronseder et al. | 198/434 |
| 4,526,128 | 7/1985 | Sorace et al. | 198/625 X |
| 4,693,055 | 9/1987 | Olsen, Jr. et al. | 198/425 X |
| 4,771,589 | 9/1988 | Mueller et al. | 198/404 X |
| 4,875,309 | 10/1989 | Long, III | 198/625 X |
| 4,925,001 | 5/1990 | Mollenkamp | 198/467.1 X |
| 4,974,721 | 12/1990 | Born | 198/436 X |
| 5,050,720 | 9/1991 | Carnkshaw | 198/625 X |
| 5,058,725 | 10/1991 | Gamberini et al. | 198/625 X |
| 5,143,199 | 9/1992 | Evans | 198/418.1 |

FOREIGN PATENT DOCUMENTS

| | | |
|---|---|---|
| 0438885A1 | 7/1991 | European Pat. Off. |
| 961743 | 6/1964 | United Kingdom |

Primary Examiner—James R. Bidwell
Attorney, Agent, or Firm—Banner & Allegretti, Ltd.

[57] ABSTRACT

A system for handling cylindrical cans or the like and conveying them from filler and closure equipment to and into hydrostatic sterilizer carriers. After the cans have been filled and closed, they are conveyed upright to a receiving area. A screw assembly is periodically actuated, taking cans from the receiving area, grasping their cylindrical sidewalls and laying them down and forward into a metered can stick. This can stick is rolled laterally by a clamp-kicker assembly into the hydrostatic sterilizer carriers as they are conveyed past it. The screw assembly includes a pair of horizontally disposed screws, both rotatable downwardly and inwardly and with the axis of one spaced above that of the other. With one complete rotation of the screws a can held therebetween on its cylindrical sidewalls is positively laid forward onto its side. With an adequate supply of cans in the receiving area, the controlled rotation of the screws determines how many cans are laid forward to thereby form the can stick. Also, if a sensor detects that a can being conveyed to the screws has fallen down then the rotation of the screws is automatically stopped.

20 Claims, 13 Drawing Sheets

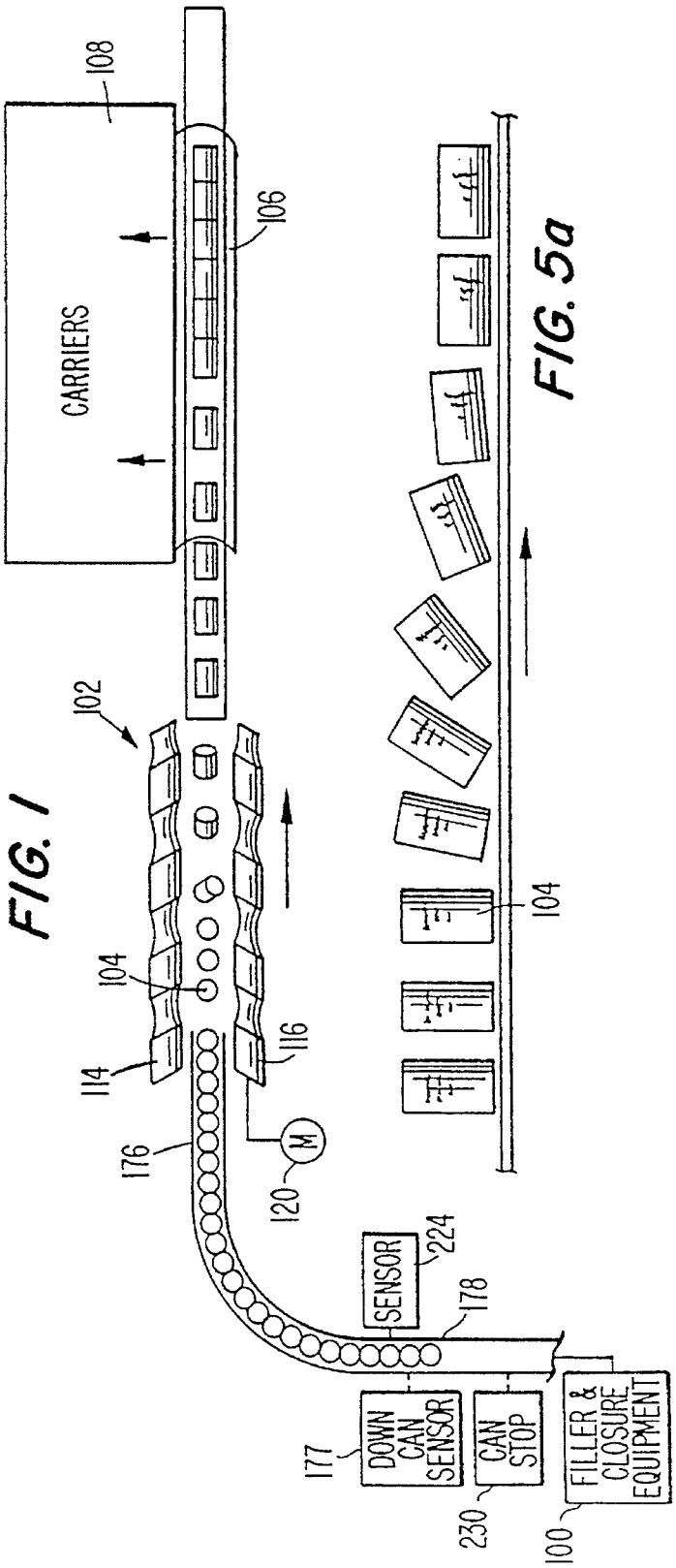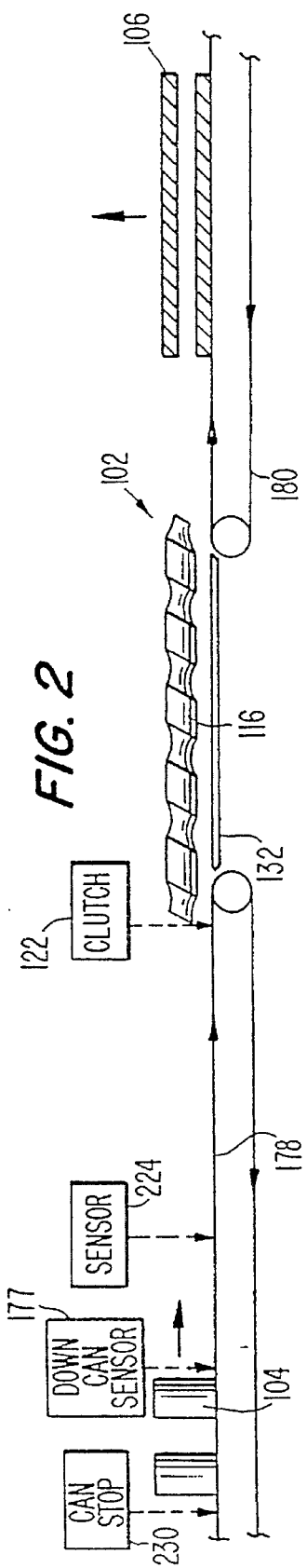

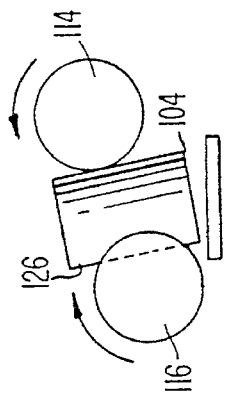
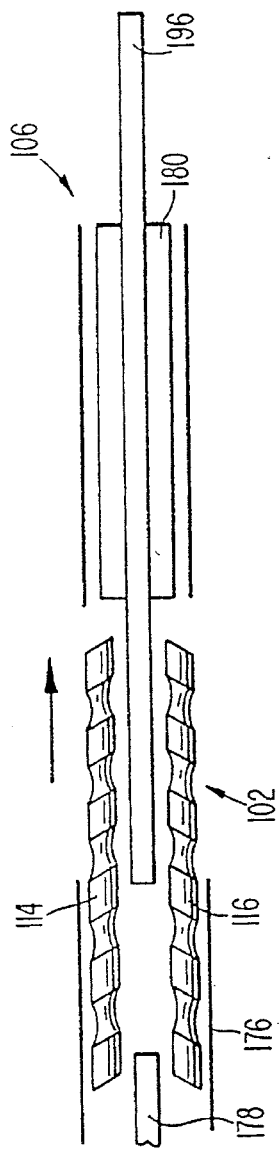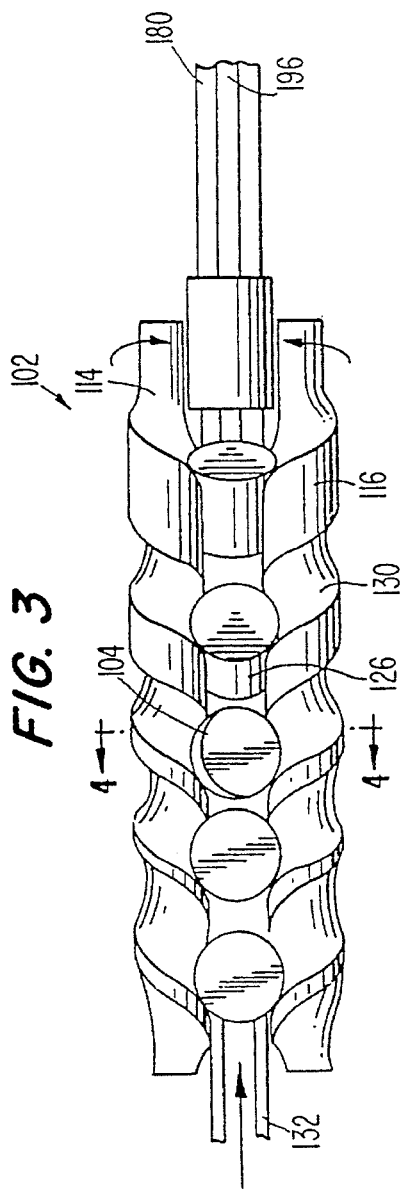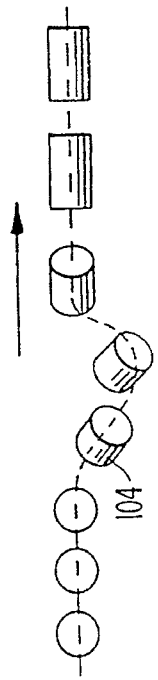

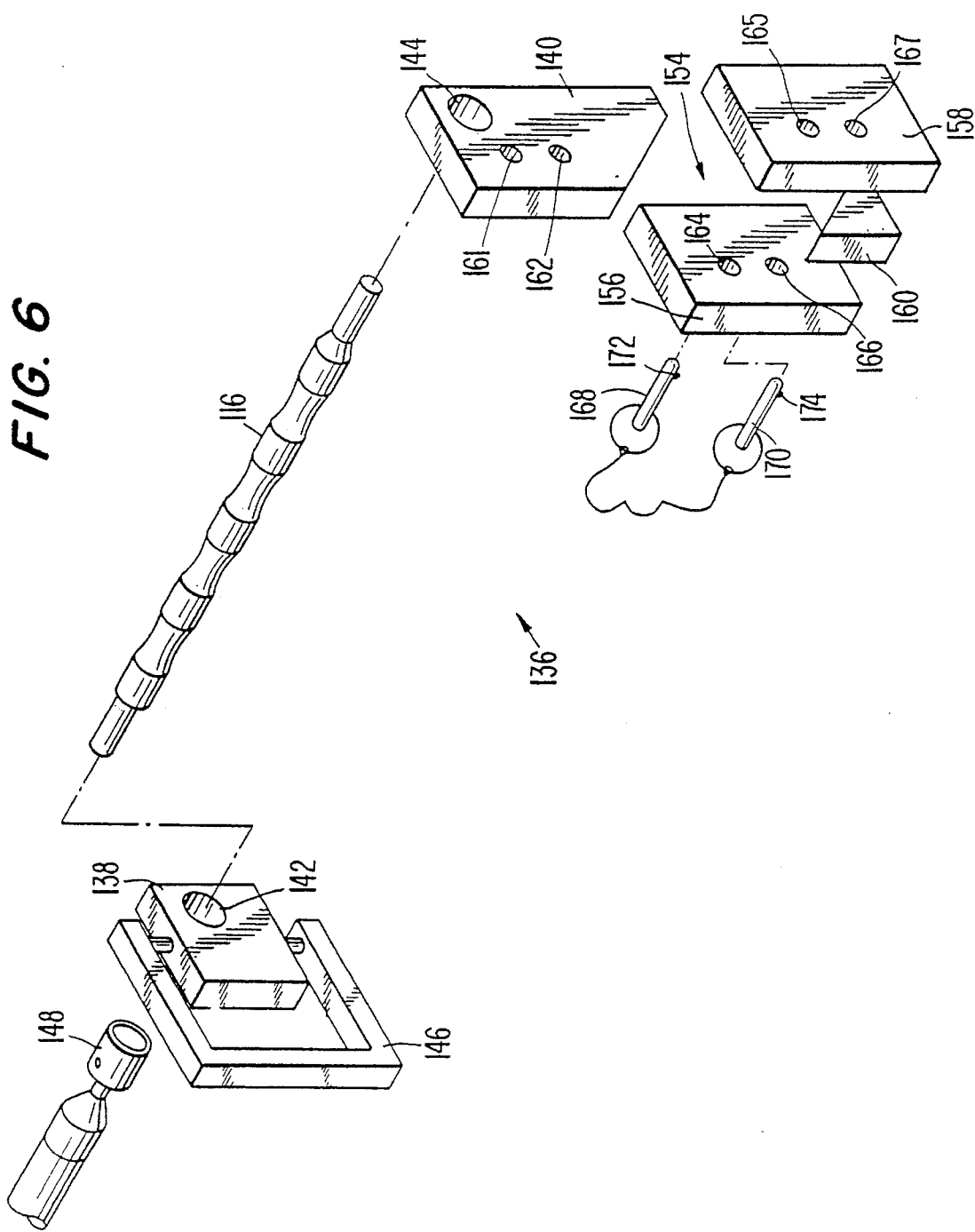

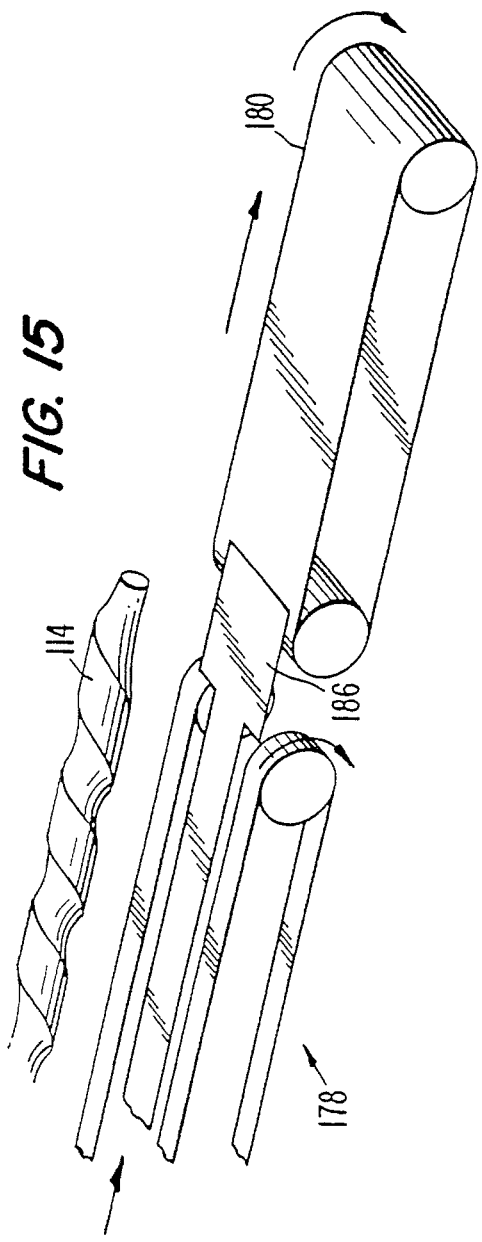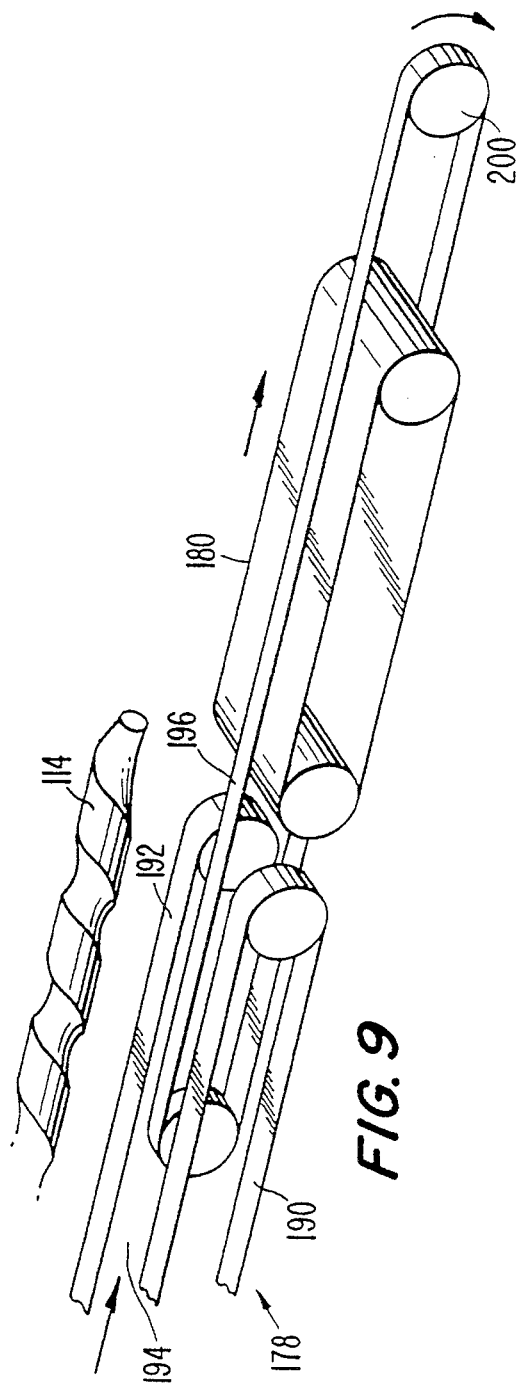

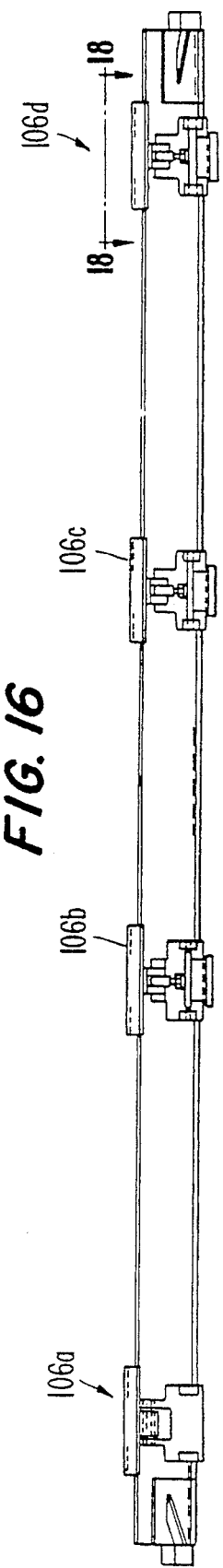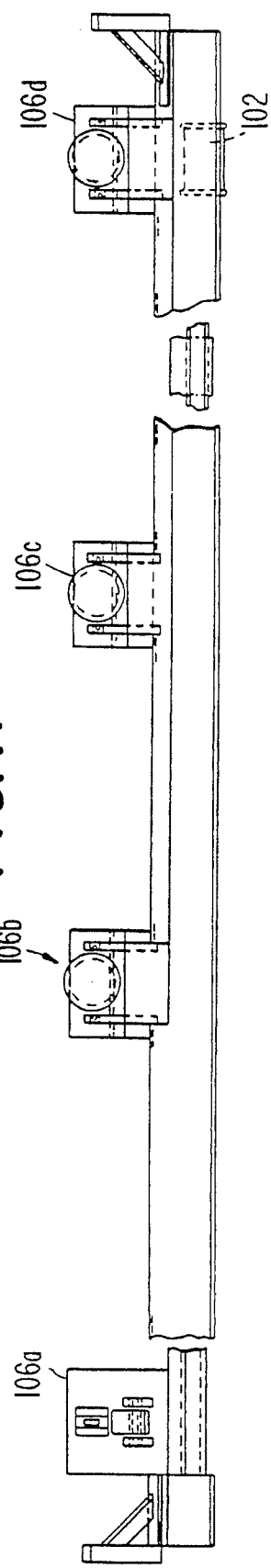

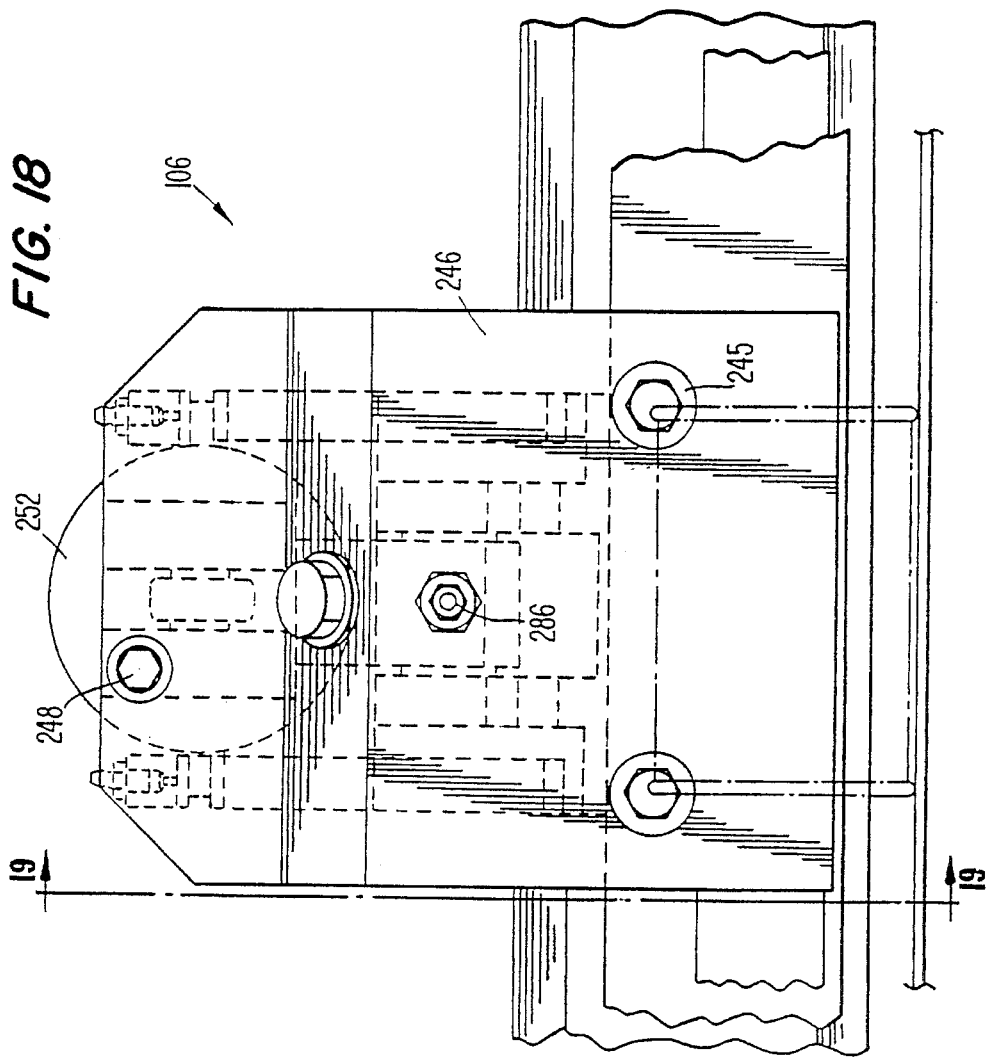
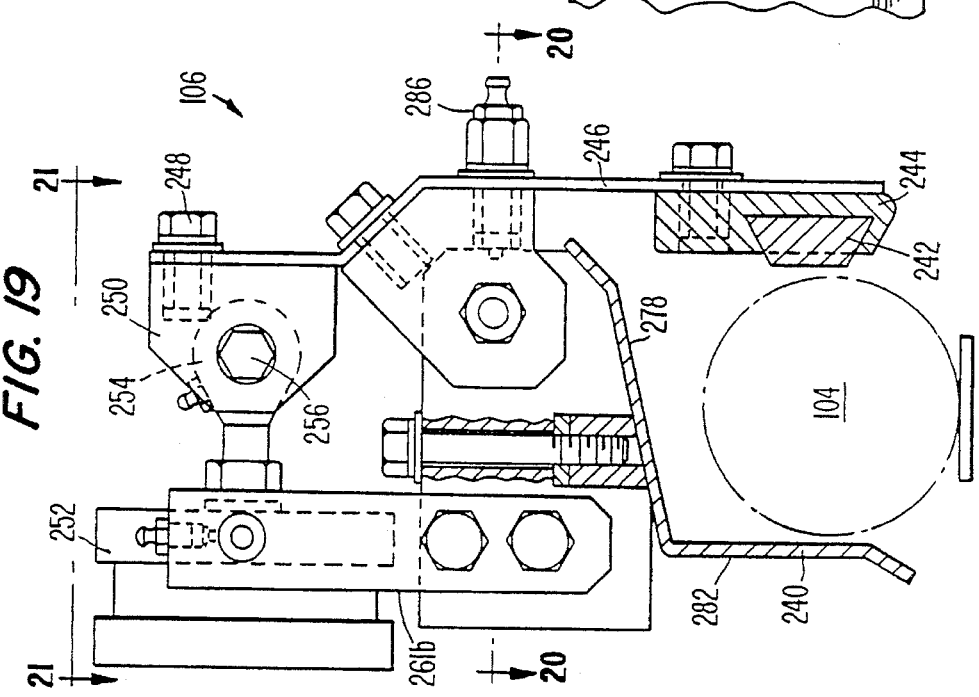

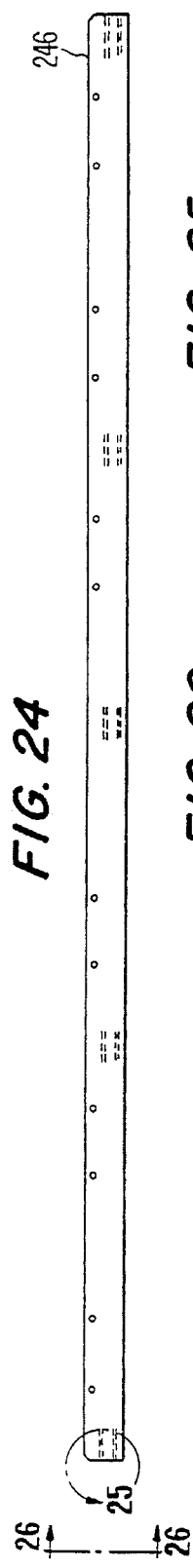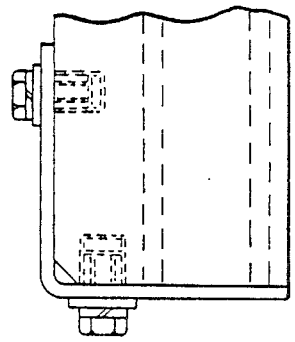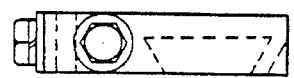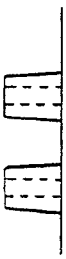
FIG. 22
FIG. 23
FIG. 24
FIG. 25
FIG. 26
FIG. 23a

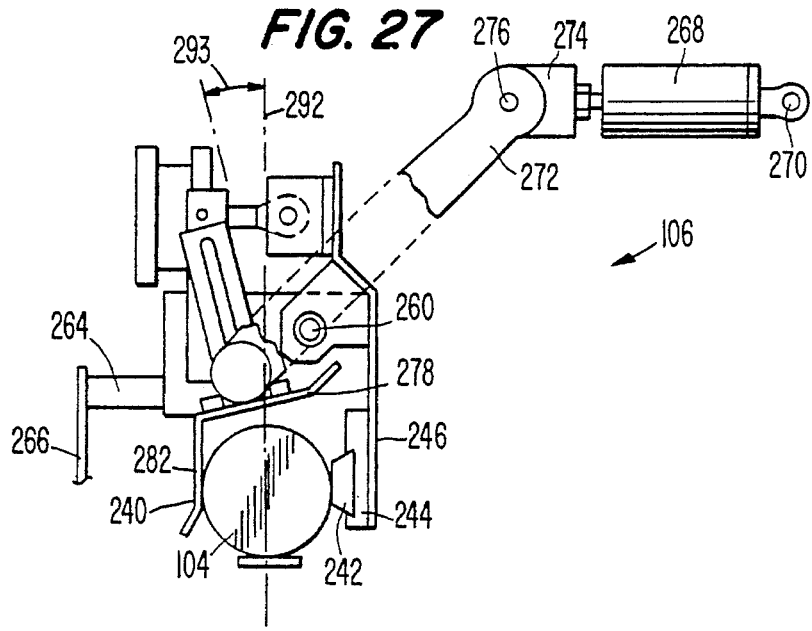
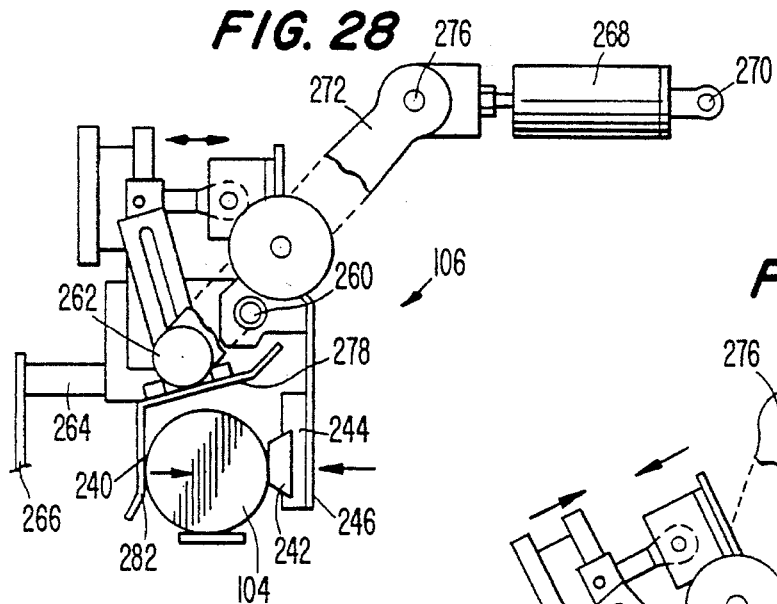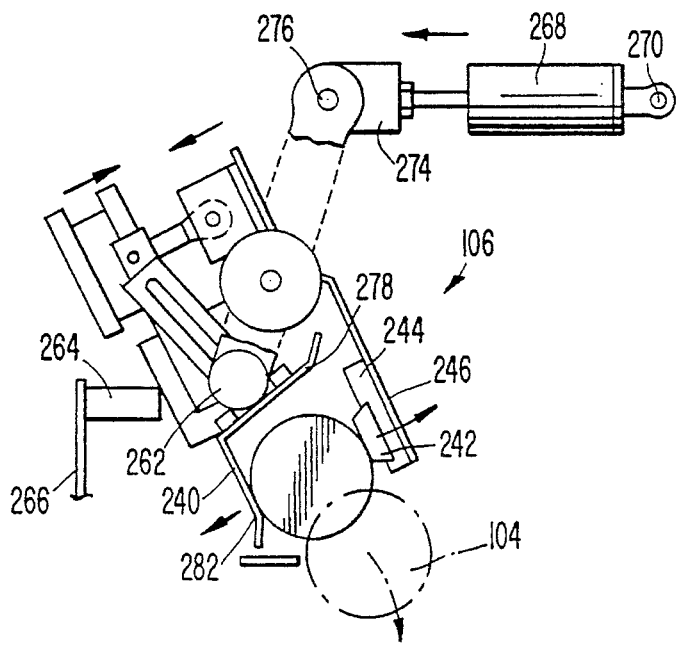

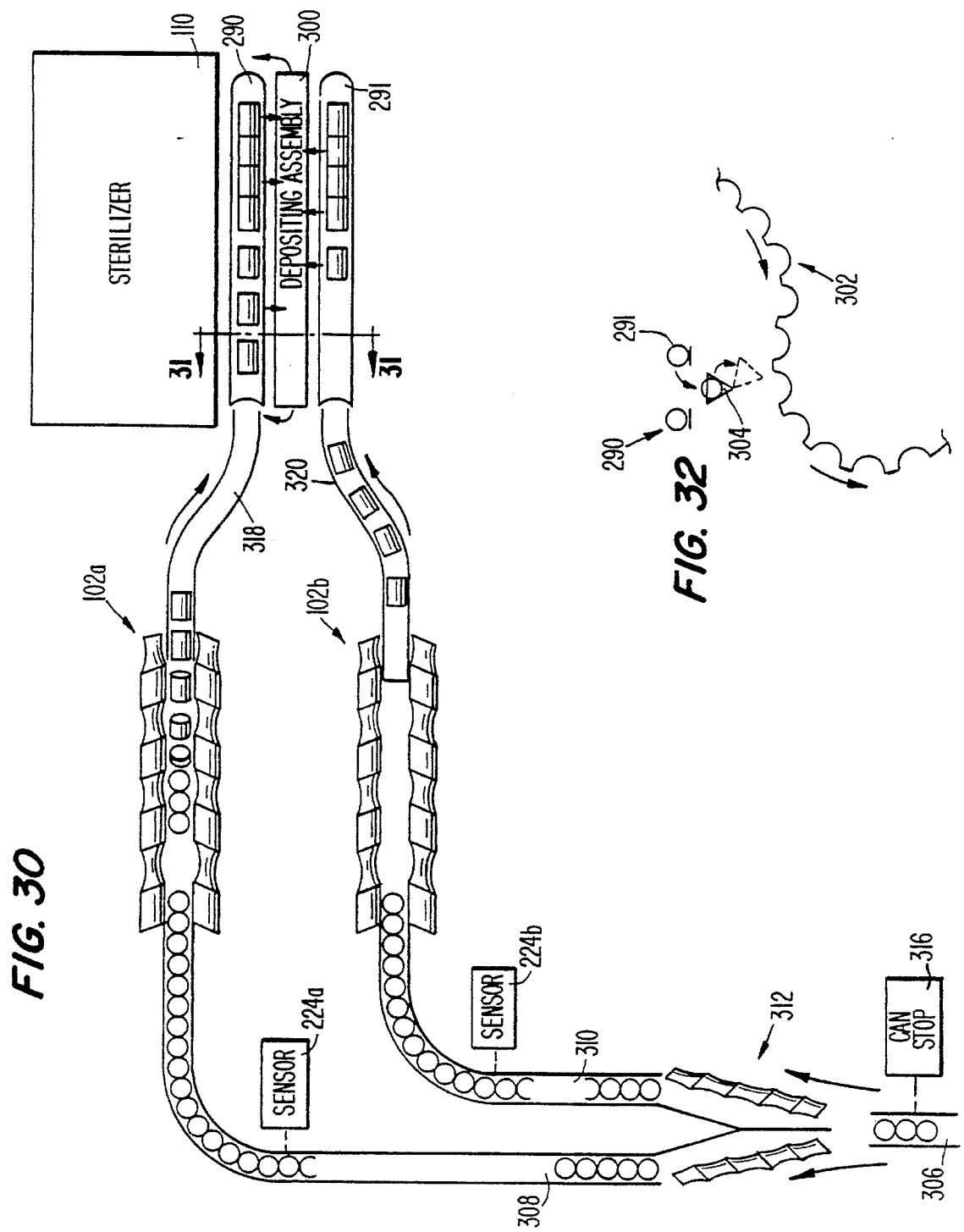

KICKER CLAMP FOR CONTAINERS

This application is a continuation of application Ser. No. 07/878,693, filed May 25, 1992, U.S. Pat. No. 5,355,991.

BACKGROUND OF THE INVENTION

The present invention relates to systems for manipulating and conveying cans or packages of foods, such as soups, vegetables or the like, from filler and closure equipment to hydrostatic sterilizers. It additionally relates to equipment for quickly toppling containers, such as soup cans, from upright vertical orientations to laid-down horizontal orientations.

Food products that are degradable and are not to be refrigerated need to be sterilized after being canned. In other words, products, such as soups, vegetables and the like— some of which are partially blanched, some of which are cooked and some of which are cold, depending upon their recipe—are filed in the containers and the containers sealed closed. These containers can, for example, be plastic cans, plastic cups, aluminum cans or steel cans. A means for effective commercial sterilization of the sealed products is to convey them on a continuous conveyor chain through a hydrostatic sterilizer, such as those manufactured by Stork Amsterdam BV (Stork) of The Netherlands or by FMC Corporation (FMC) of San Jose, Calif. Hydrostatic sterilizers are shown in U.S. Pat. Nos. 3,286,619, 3,511,168, 3,545,985, 3,615,725, 3,619,126 and 3,986,832, for example. (These patents and all other patents or publications mentioned anywhere in this disclosure are hereby incorporated by reference in their entireties.)

Another known very recent sterilizing system is disclosed in European Application Publication Number 0.438.885.A1, which is assigned to Campbell Soup Company (Campbell Soup) of Camden, N.J. This system has a separate and novel pre-heating leg which significantly preheats the packages of different products differently as needed before they enter and am conveyed through the hydrostatic sterilizer, advantageously at the same dwell time and temperature.

These sterilizers are large pieces of equipment, generally twelve to twenty feet wide, anywhere from twenty to forty to sixty feet deep and seven to ten stories tall, and are mounted on a concrete base. The cans are carried in "sticks" (a plurality of end-to-end aligned cans) on carriers continuously conveyed in a loop-shaped path in the sterilizer tower and through the different legs of the tower. A "stick" of cans typically comprises twenty cans but this can vary depending on the can height (that is, the can length when the cans are laid down), the can or package expansion rate and the sterilizer time-temperature relationship. Fewer than twenty cans may form a stick when the cans are large, but not necessarily more than twenty when the cans are small, due to sterilizer speed providing sufficient time for loading. The sticks of cans in these carriers typically travel through a water bath leg, a heat or steam chamber leg, and a cooling section leg of the sterilizer and then are discharged. The carriers are moving continuously through the legs whether the carders are empty, fully loaded or partially loaded with cans.

In particular, in the Stork and FMC hydrostatic sterilizers there is typically first an infeed leg where the cans are conveyed upwards and into a bath of water. This water leg holds on one side thereof the bubble or steam dome, that is, the steam sterilization area. The can is in this sterilization area for about fifteen minutes, conveyed out to a water leg which holds the other side of the steam dome, and to a cooling section, that is, into cold water where cool water is sprayed on the can. The can or package spends anywhere from fifty minutes or one hour to three hours, depending on the cook time, the can diameter and the product in the can, in the hydrostatic sterilizer. The sterilizer ensures that heat penetrates the outside of the can to the center of the product in the can sufficient to raise the product core to a sterilizing temperature.

In the prior an systems the cans are filled and sealed in an upright position but are horizontal when in the sterilizer carders. Examples of known filler equipment are Campbell Soup's "E.R.& D" and the fillers available from Elmar Industries of Depew, N.Y., and from FMC; and an example of closure equipment is that available from Angelus of Los Angeles, Calif. A system is thus needed to reorient the cans and to line them up end-to-end into the "sticks." This system must form the can sticks relatively quickly since the carriers move by at a rate of approximately thirty per minute. That is, there is only about two seconds to load each stick of twenty laid down cans in each carrier. A number of systems for counting and reorienting the cans and forming them in can sticks are known. However, these systems have a number of problems as discussed below.

One prior art counting or metering system comprises a multi-pointed star rotatable about a vertical axis and having five to seven pockets for spacing and metering containers. It is available from Stork as the "Telestar Counting and Metering System." The cans enter the "star" of this system vertically. The star by its rotation counts the cans and then stops the further flow after the desired number of cans have passed through it. If a random can enters the star while the star is spinning, the can often gets caught between the pinch points of the star, that is, the high points or the lobes, and thereby damages or jams the device. Since these star devices are also subject to slippage, the star either has to be stopped sooner than desired or it does not place a full twenty cans in the stick. In other words, to prevent jamming or can denting, the star was allowed to slip, but this slippage would not guarantee a consistent feed rate.

After being counted, the cans are toppled by a toppling device onto their sides. Them are a number of known prior art toppling devices. One is a toppler belt system, which consists of two belts set ninety degrees apart from one another and disposed forty-five degrees off of the deck to thereby form an inverted "V". The chime or the base of the can which is on the chain conveyor is then intercepted by the toppler belts. Since the toppler belts are running at a faster speed than that of the infeed conveyor, the bottoms or chimes of the cans, when they hit the toppler belts, are pulled up from under the cans thereby laying the cans backwards. That is, the can bottom is pulled out from under and the top of the can lays backwards. However, if there is any liquid, such as water, broth or other moisture, on the belts or on the cans, the cans tend to slip and may not fall down. Also, if the can is dented or has a defective base or chime, it may not fall. When the cans do not fall down, the toppling system jams.

Another known toppling system is a twisting can slide and is available from FMC. With this chute system there are first and second conveyors, one spaced about a foot to a foot and a half higher than the other and with an interconnecting slide or chute. The cans are conveyed to the end of the top conveyor, shoot off of that conveyor, fall over and slide down the chute to the other conveyor. Can jams can occur because no space is formed between the cans as they fall. That is, the cans tend to topple down on one another and there is a rebounding or a backward and forward motion of the cans. In other words, the FMC system uses an angled chute down which the can travels while standing vertically in a can track. At the end of the chute is a stainless steel trough which the base of the can hits causing the can to fall forward onto its side. Since this toppling action is dependent upon gravity, there is a limit to the speed obtainable, of only about four hundred cans per minute.

After a line or stick of toppled containers has been formed, this stick is kicked or robed laterally into the bars of the traveling carder of the hydrostatic sterilizer as the carrier is conveyed past the stick, and the carriers then convey the sticks through the sterilizer. The carriers have large diameter carrier bars to accommodate different sized cans, and these carders are shaped like open-ended "C" clamps. As the carder travels about a radius the ends thereof open up and when it travels in a straight path the "C" clamp closes. The diameter of the "C" is larger than the 211 diameter can so that the carder clamp can handle not only 211 diameter cans but also 305 inch diameter cans. By having these carders able to accommodate different size cans and by rolling the cans into the carrier bars, a single size set of carrier bars can be used for different sizes of cans. This is advantageous since there are approximately two thousand stainless steel carrier bars in a sterilizer, and thus to change the carder bars each time the can sizes are changed would be time consuming and expensive.

A prior art system for kicking the can sticks into the conveyor comprises an inverted trough type system, configured similar to an upside down house gutter. As that "gutter" is pivoted it kicks the cans and rolls them into the carrier bars. The cans, however, have a tendency to stand up instead of rolling into the carrier, which can jam the machine and/or dent the cans. If a can stands up outside the carrier before the carrier squeezes it, there is a safety bar and a warning light which are activated to stop the motion of the machine, and alerting the operator to manually pull the can out and reset the machine. As can be appreciated, this slows down the operation of the sterilizer and is labor intensive.

Systems are also known for feeding sticks of cans alternatingly from opposing sides into the carder bars to increase the can throughput. The cans are divided into two lines, one to each of the two kicker troughs. One method of dividing them provides an engage and disengage stop that works off the carrier parts of the cooker or sterilizer. The stop clamps the conveyance area, the cans accumulate behind it, the stop is released and a V-shaped diverter gate changes from a single chain to two flat-top conveyors that swing side-to-side at a set rate and the cans are then fed randomly. As it swings side-to-side and cans are coming in and are being discharged from the gate, the cans would tend to be knocked onto the floor and/or to jam the machine. A spring across the joint has thus been provided in the past for these systems to keep the cans from jumping off the track. That is, a bar device extends across the conveyor guide at a height such that cans laying on their sides will pass freely under it. Those which are still standing, however, will hit the bar, tripping the device and thereby shutting the machine off, and thereby indicating that a can is not in its proper laid-down orientation. Each conveyor then feeds cans to a separate kicker trough.

Examples of other prior art systems for handling various articles are shown in U.S. Pat. Nos. 2,092,773, 3,339,702, 3,403,770, 3,403,771, 3,511,168, 3,640,375, 3,827,211, 4,693,055 and 4,771,589.

It is also important that the cans after being filled and sealed are deposited quickly into the sterilizer. The travel time from the filling area to the sterilization area can be any number of minutes depending on the length of the conveyors and the distance from the filler and closure equipment to the sterilizer. The cans typically travel some distance from the filling area—on can tracks, cables, flat-top conveyors, rubber belts and/or the like—to the hydrostatic sterilizer, which might be on the opposite side of a hundred yard long building. In other words, the filled cans may have to travel anywhere from one to five minutes to reach the hydrostatic sterilizer. When the product has been heated before being canned, the temperature of the canned product before entering the sterilizer cannot drop below a mimimum temperature, which is normally 80° F. If it does, the product will not sterilize properly at the sterilizer dwell time and temperature. For example, the system may be designed for an initial 80° F. temperature so that it will cook for fifty minutes at 210°or 250° F. If the package goes in at a lower 60° temperature then the core of the product in the package will likely not be heated properly in the sterilizer to thereby kill the bacteria therein. Accordingly, the cans after filling and sealing must quickly be conveyed to the area adjacent the sterilizer, laid down into can sticks and kicked into the sterilizer carriers.

Further, the cookers when operationally mounted are typically positioned in a close environment with adjacent pipings, instrumentations, computers, utility lines and so forth; that is, space in the sterilizing facilities is limited. Thus, any changes to the sterilizing system to make it more efficient and remedy these problems in the prior art must work within this limited space. Major retrofits which would involve moving buildings, pillars, columns, steam lines, utility services, roofs, walls or I-beams, draining pipes, or actually moving the ten-story hydrostatic sterilizer on its concrete base would likely be cost prohibitive.

A system which more efficiently, dependably and quickly meters the cans and topples them forward without any can jams is accordingly needed. The known systems are unable to maintain a constant twenty cans per stick but rather only a maximum of nineteen cans has been consistently possible in the past. Higher rates through the sterilizer are also being used now, since the closure equipment is filling and closing at higher speeds and the cooking time in the sterilizer is being reduced, from sixty minutes to fifty minutes, due to controlled initial temperature (fill temperature) and the previously-mentioned separate cooker preheat leg. For example for a fifty-five minute process, a rate of 26.6 can stick carriers per minute is possible, while for a fifty minute process 29.7 to 30.0 carriers per minute rate is possible. This allows for a greater throughput and more cost effective use of the sterilizer, thereby further increasing the need for an improved can metering and toppling system.

SUMMARY OF THE INVENTION

Accordingly, it is a principal object of the present invention to provide an improved handling system for cans and other containers, which system has fewer downtime occurrences.

Another object of the present invention is to provide an efficient can handling system which can be easily retrofitted into existing hydrostatic sterilizing facilities.

Directed to achieving these objects, an improved container handling system is herein disclosed. This system includes a twin timing screw device which meters and topples cans forward in the direction of their travel and forms the required stick of cans prior to deposit into a hydrostatic sterilizer unit for production processing. This device includes a pair of parallel timing screws mounted laterally above a horizontal flat top conveyor and overhung in line with a discharge belt conveyor. A backlog of standing vertical cans are conveyed, guided and then held between the screws' pitches until the sterilizer is ready to accept them. When the sterilizer is ready, the screws are rotated inward together at a predetermined speed and with the necessary revolutions, controllably throwing the correct number of cans forward onto their sides. This forward toppling action forms a predetermined number of laid-down horizontal cans, creating a can stick which is then deposited into the sterilizer's carriers. One screw pitch is used for each can; that is, one complete screw revolution conveys and topples one can. The timing screw speed is prorated to the processing speed of the sterilizer. This timing screw device thus replaces the prior art Telestars that space and meter the containers, the toppling belts that lay the cans, and the braking clamps used to separate cans to form the sticks. It provides these spacing metering, toppling and stick forming operations in a single compact efficient system.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a top plan view of a can toppling and feeding system of the present invention.

FIG. 2 is a side elevational view of the system of FIG. 1.

FIG. 3 is an enlarged top plan view of the toppling screw device of the system of FIG. 1.

FIG. 4 is a view taken on line 4—4 of FIG. 3.

FIG. 5a is a side elevational view of cans, illustrated in isolation, as they travel through the toppling screw device of FIG. 3.

FIG. 5b is a top plan view of cans, illustrated in isolation, as they travel through the screw device of FIG. 3, and is similar to the view of FIG. 5a.

FIG. 6 is an exploded perspective view illustrating the removable mounting for the screws of the toppling screw device of FIG. 3.

FIG. 8 is an enlarged top plan view of the transfer belt assembly of the system of FIG.(S) 1 (or 7) for transferring the cans from the screw device to the landing belt.

FIG. 9 is an enlarged perspective view of a forward portion of the assembly of FIG. 8.

FIG. 15 is a perspective view, similar to the view of FIG. 9, showing an alternative (plate) transfer system of the present invention for transferring cans from the screw device to the landing belt.

FIG. 16 is a top plan view of the clamp-kicker assembly of the system of FIG. 1.

FIG. 17 is an elevational view of the assembly of FIG. 16, having portions thereof broken away for illustrative purposes.

FIG. 18 is an enlarged view taken on line 18—18 of FIG. 16.

FIG. 19 is an end view taken on line 19—19 of FIG. 18.

FIG. 22 is a top plan view of the frame member, illustrated in isolation, of the assembly of FIG. 16 with alignment lugs illustrated for the pivot pneumatic assemblies, as shown in FIG. 18.

FIG. 23 is a side elevational view of the frame member of FIG. 22.

FIG. 23a is an enlarged view taken on circle 23a of FIG. 23 and showing in detail the pneumatic pivot mount.

FIG. 24 is a side view of the clamping member of the assembly of FIG. 16; this clamping member is mounted via the pneumatic assemblies of FIG. 18 to the kicker frame of FIG. 22.

FIG. 25 is an enlarged view taken on circle 25 of FIG. 24, and illustrating the bolting of a urethane liner for containment in the clamping member.

FIG. 26 is an end view of the clamping member portion shown in FIG. 25 and is taken on line 26—26 of FIG. 24.

FIG. 27 is a cross-sectional view of the clamp-kicker assembly of FIG. 16 illustrated in a clamped position on a stick of cans.

FIG. 28 is a view similar to FIG. 27 showing the assembly in an initial clamped/kicking position.

FIG. 29 is a view similar to those of FIGS. 27 and 28 showing the assembly in a subsequent kicking release position.

FIG. 30 is a top plan view of a two-sided feed and divider system of the present invention, with a side flexing conveyor chain; it is an alternative to the (single-side feed) system of FIG. 7 and is similar to the dual feed system of FIG. 7.

FIG. 32 is a stylized elevational view of a trough feed embodiment of the present invention and is an alternative to the rotating barrel embodiment of FIG. 31.

DETAILED DESCRIPTION OF PREFERRED EMBODIMENTS

Figure 10:
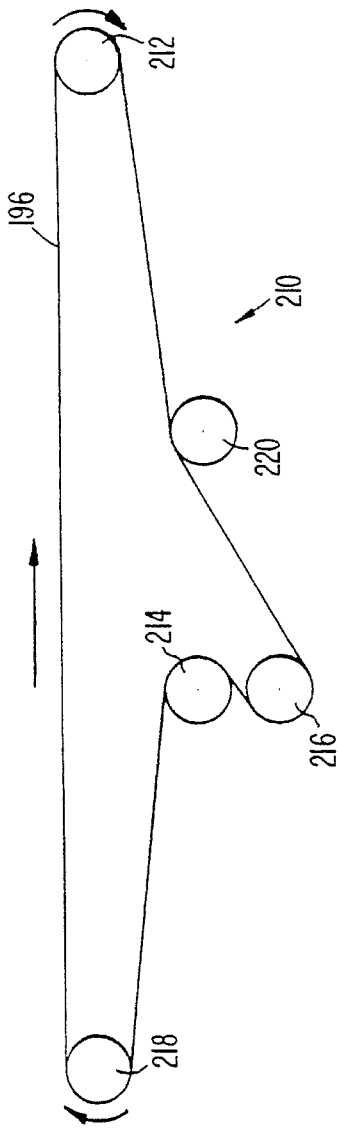
FIG. 10 is a side elevational view of an alternative, preferred transfer belt drive, illustrated in isolation, of the assembly of FIGS. 8 and 9.

Illustrated in the drawings are a number of systems of the present invention for conveying filled and sealed upright cans, packages, containers or the like from filler and closure equipment shown generically at 100 to a screw device shown generally at 102 in FIG. 1 for example. The screw device 102 meters the cans 104 and lays them forward into can sticks and conveys these sticks to a clamp kicker device shown generally at 106 in FIGS. 18–21 and 27–29, for example, which rolls the sticks laterally into the carder bars 108 (shown generically in FIG. 1, for example) of a hydrostatic sterilizer 110, such as is shown generically in FIG. 7. The screw device 102 comprises a pair of horizontal screws 114, 116, as shown in FIG. 3 for example, disposed so that the longitudinal axis of one is generally two inches above the longitudinal axis of the other, as can be understood from FIG. 4. The screws 114, 116 are rotated by a drive motor 120 at identical speeds and downwardly and inwardly towards one other, as indicated by the curved arrows in FIGS. 3 and 4, and have a maximum rotational speed of five hundred revolutions per minute.

The drive motor 120 can be, for example, a two hundred and forty Volt AC, three phase washdownproof motor with an Allen Bradley 1333 frequency controller operating through a tachometer. Instead of using gear boxes, pulleys and the like, this motor 120 uses an electronic frequency controller, which accurately changes the motor speed by changing the current delivered to it. Referring to FIG. 2, a clutch 122 stops and starts the screw device 102 through the motor 120, and a preferred clutch is a Warner wrap-spring clutch having a positive detent actuation. The more torque placed on this clutch 122 the tighter it becomes. A plurality of spaced, positive engagement stops are provided to lock into the clutch 122 and stop the movement of the machinery on the driven side of the clutch so the motor 120 and the drive push in the clutch continue to operate. Thereby, the screws 114, 116 stop at the exact same spot each time and there is never a can 104 partially in the last flight of the screws, which could result in untimely release or partial knockdown causing a jamming.

The screws 114, 116 themselves are each about twenty-four inches long and are formed of ultrahigh molecular weight (HMW) polyethylene in a machine cutting manufacturing process. The flights of the screws 114, 116 are configured for specific size cans 104 or other containers, for taking these cans and grasping them on their straight sidewalls 126 and toppling them forward in the movement shown in FIGS. 3, 5a and 5b for example. The screw flights 130 can be approximately 1.5 inch deep for three inch diameter size cans, for example, and a diameter for those screws 114, 116 would be between four-and-a-half and six inches. With one complete turn of these screws 114, 116, a can 104 is grasped and toppled forward so that its top end is forced positively and controllably forward. In other words, the can 104 does not depend upon gravity to topple it so that if the base of the can and/or the conveyor 132 is wet with broth, water or other moisture, the can would not slip and thereby be prevented from efficiently toppling. The longitudinal axes of the screws 114, 116 are disposed one above the other, as previously mentioned and as shown in FIG. 4, since if they were at the same level, the screws, when rotated, would crush or crunch the cans 104. These offset screws 114, 116 contact the top portions of the cans 104 on their cylindrical sidewalls 126 and roll the cans forward over the bottom screw (116), as can be understood from FIGS. 3, 4, 5a and 5b.

This screw toppling device 102 can be used for today's two-pie and three-pie steel soup cans (104). The (prior art) two-piece can is formed by a redraw process making a cylinder cup shape and with a top or an end then secured on it. A (prior art) three-piece process forms a cylindrical tube and applies ends or chimes on the bottom and at the top. As can be appreciated by those skilled in the art, this screw device 102 can be adapted to handle not only these soup cans generally any type of cylindrical walled container including those with top necks and those made from materials other than steel and aluminum, such as glass and the like. The length and pitch (flights 130) of the screws 114, 116 are adjusted for the different size packages. When the device 102 is to handle and feed a different size can or package, the adjustment process for it is straightforward. The screws 114, 116 being used are removed and another set of screws with a different pitch, to accommodate the different size can, are installed.

Referring to FIG. 6, the assembly for removably mounting one of the screws 114 (or 116) is illustrated generally at 136; the mounting assembly for the other screw 116 (or 114) being a mirror image thereof. A pair of mounting blocks 138, 140, each having a through-hole 142, 144, respectively, with bushings disposed therein, are provided, one block for each end of the screw. The block 138 closest the connection to the motor 120 is pivotally secured in and to a C-shaped bracket 146 mounted to the conveyor (132). The drive end of the screw 114 is inserted through the through-hole 142 of the pivotal mounting block 138 and into the universal joint connection 148 to the drive motor (150). The other end of the screw is inserted in the through-opening 144 in the other mounting block 140, and the mounting block (140) is inserted into the slot 154 defined by the support blocks 156, 158 and the spacer block 160, such that the lock pin holes 161,162 of the mounting block are aligned with the lock pin holes 164, 165, 166, 167 through the support blocks 156, 158. The support blocks 156, 158 are mounted to the conveyor, as is the C-shaped bracket 146. When the holes 164, 144 and 165 and 166, 162 and 167 are aligned, the locking pins 168, 170 are inserted in them and the outwardly biased buttons 172, 174 at the ends of the locking pins snap out thereby holding the pins in place.

To remove the screw(s) 114, 116 for replacement or repair a reverse procedure is followed. That is, the buttons 172, 174 are depressed, the locking pins 168, 170 removed, the mounting block 140 pivoted out of the slot 154, and the opposite end of the screw is pulled out of the universal joint 148 and out the through-opening 142 in the pivot block 138. The pivot block 142 pivots so that the screw 116 can be easily removed from its confined mounting area.

When the screws 114, 116 are changed to accommodate different size packages or cans, the center distances between the screws accordingly change. To prevent the incoming cans from tilting, the infeed mils 176 are adjusted by loosening locking hardware. This adjustment prevents tilting and sliding inward or outward or side-m-side cocking of the cans 104 since the cans must be vertical to be accepted by the screws. If the cans tilt and them is back pressure on the cans, the cans can pop completely out and off of the conveyor or fall on their sides onto the conveyor. If a can 104 enters the screw toppling device 102 on its side, a lockup or jam occurs.

Figure 7:
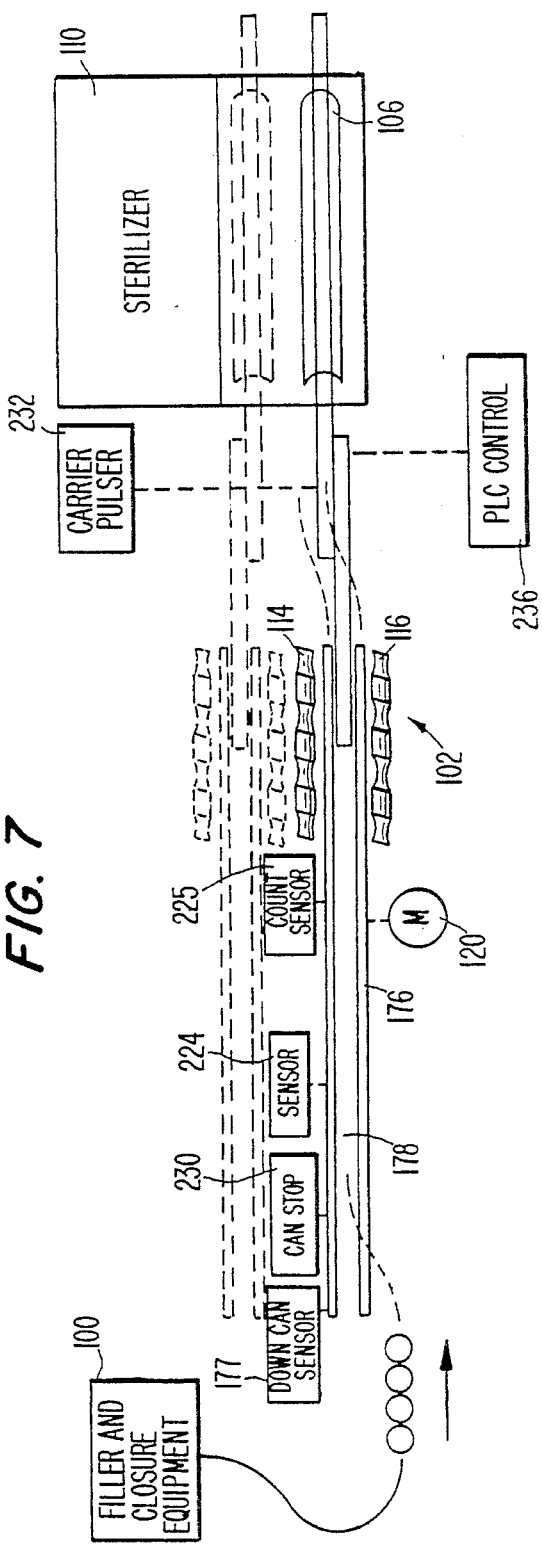
FIG. 7 is a top plan view, similar to the view of FIG. 1, of an alternative can toppling and feeding system of the present invention; this system is configured to provide space for a twin or dual feed system, wherein a second feed system is illustrated in the figure in phantom lines.
Figure 11:
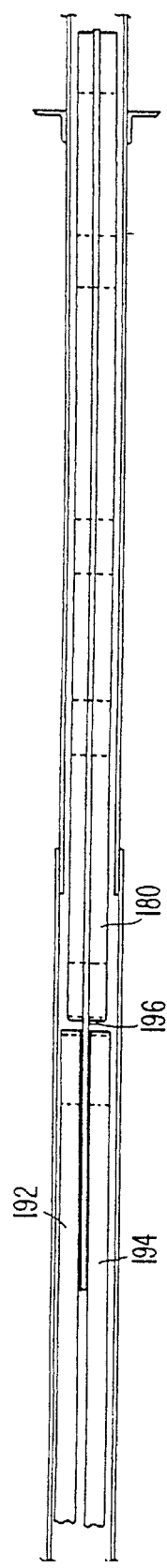
FIG. 11 is a top plan view of the exit portion of the toppling conveyor, and is a detail of the assembly of FIG. 8.

A "down" can sensor system as shown generally at 177 in FIGS. 1, 2 and 7 is provided in a preferred container toppling system. The sensor system 177 includes a pair of proximity "pico" sensors positioned one above the other and upstream of the screw toppling device 102. While the top sensor is positioned at a sufficient height to detect a vertical can passing by it, the bottom sensor is positioned so that it does not detect a vertical can but does detect a horizontal can. Thus, as a vertical can passes by the sensors, both sensors are energized, and nothing is caused to happen by the PLC control (236). However, when a "down" can passes, the top sensor is made and the bottom one is not made. This information is delivered to the PLC control (236) which then shuts the motor 120 off, thereby stopping the rotation of the screws. The height locations of the sensors can be adjusted to accommodate different can heights.

The screw toppling device 102 not only lays the cans 104 forward but also spaces them apart. It creates a gap between cans, as seen in the right side of FIG. 5b, as the cans are being laid down so that the cans do not topple onto one another, which has been a problem experienced with prior art toppling devices. At the infeed to the screw device 102 the vertical cans are chime-to-chime adjacent one another. As an example for 211×400 size cans, the cans are approximately three inch center-to-center as they are being fed into the screw device 102 and at the discharge from the screw device they are approximately four inch center-to-center and laying on their sides. To space them the cans are accelerated in the flights of the screws 114, 116 to pull them apart so there is room to lay them over. Accordingly, the screws 114, 116 grab the cans 104 on their straight cylindrical sidewalls 126 and positively and in a controlled motion lay them down forward and spaced.

The conveyor belt or chain 178 conveying the upright cans directly to the feed area in front of the screw device 102 is continually running. It has a non-friction top surface such that it slides underneath the cans 102 when the cans are stopped and awaiting actuation of the screw device 102 and so that the cans are not toppled on top of one another. On the discharge end of the screw device 102, in contrast, the conveyor means 180 requires a friction top surface to positively convey, without slippage, the laid down cans away from the screw device and towards the carders 108 of the hydrostatic sterilizer 110. In other words, on the infeed side of the screw device 102 a non-friction conveying surface is needed so that when the screws 114, 116 are stopped the conveyor 178 underneath slips by the stopped cans, and on the discharge side of the screws a positive take-away action is needed for the conveyor 180. Particularly, while the non-friction surface of the infeed conveyor 178 can be a hard plastic friction material, the outfeed conveyor 180 should be resilient to provide a trampoline action or soft landing for the can 104, whereby no undue stress or pressure on the can chime is exerted on the can as it is laid down. Rubber is a preferred material for the outfeed conveyor 180. As can be understood, a transition is needed between the hard plastic infeed conveyor 178 to the rubber belt discharge conveyor 180.

Figure 14:
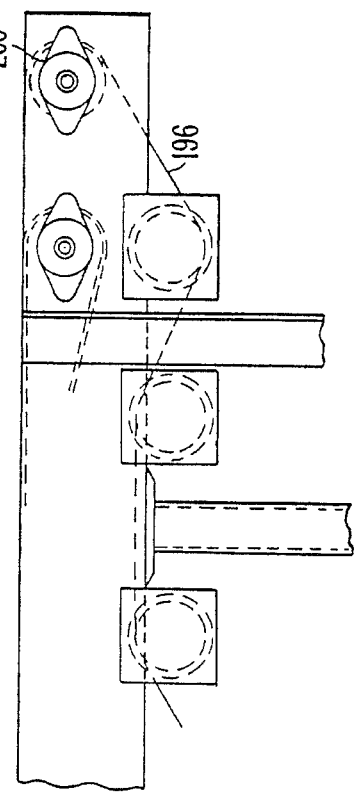
FIG. 14 is an enlarged view of the right side of FIG. 12 showing an alternative extension head pulley embodiment of the present invention, and is similar to the embodiment of FIG. 9.
Figure 21:
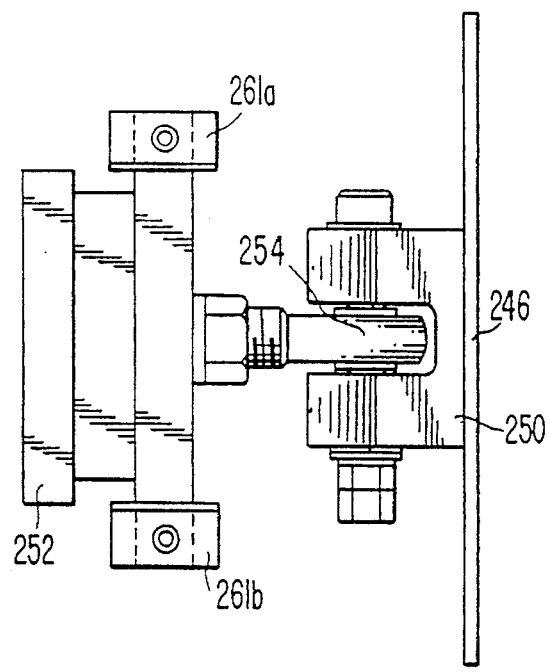
FIG. 21 is a top view taken on line 21—21 of FIG. 19 of the upper portion of the assembly.

One transition system of the present invention uses a deadplate or a cross-over plate as shown in FIG. 15 at 186. However, with three-piece cans there is the possibility of the bottom chimes of the cans catching on the deadplate 186. Thus, a preferred transition system of this invention and as shown in FIG. 9 uses a pair of side-by-side spaced infeed belts 190, 192 for the infeed conveyor 178. The gap 194 between the belts 190, 192 is minimal. (The infeed conveyor 178 can be belts made of rubber, Neoprene or Kevlar or it can be flat top conveyors, block chain or round cable.) At the screws 114, 116 a thin transfer belt 196, made preferably of a rubber polyurethane belting material, is positioned between the two infeed 190, 192 belts and extends out from or overhangs the infeed belts. This transfer belt 196 then passes over and around the landing belt 180 and around an overhead extension head pulley 200, as shown at the right side FIG. 9 and as also shown in FIG. 14.

In addition to eliminating the dead spot between the infeed and discharge conveyors 178 and 180 the transfer belt 196 has another purpose. At the last full pitch of the screws 114, 116 where the held cans 104 are vertical, if the can is dented it has a tendency to move forward and actually tends to be disposed at an angle instead of being upright, when the screws are stationary. The transfer belt 196 exerts a positive friction against the bases of the cans thereby keeping the cans vertical and upright. A transfer plate, allowing can travel transition between conveyor belts, keeps the elevations of the infeed and transfer belts 178, 180 the same. Alternatively, by using a stepping or angle plate, the infeed belt 178 can be maintained at a very slight elevation above the transfer belt 196.

Figure 12:
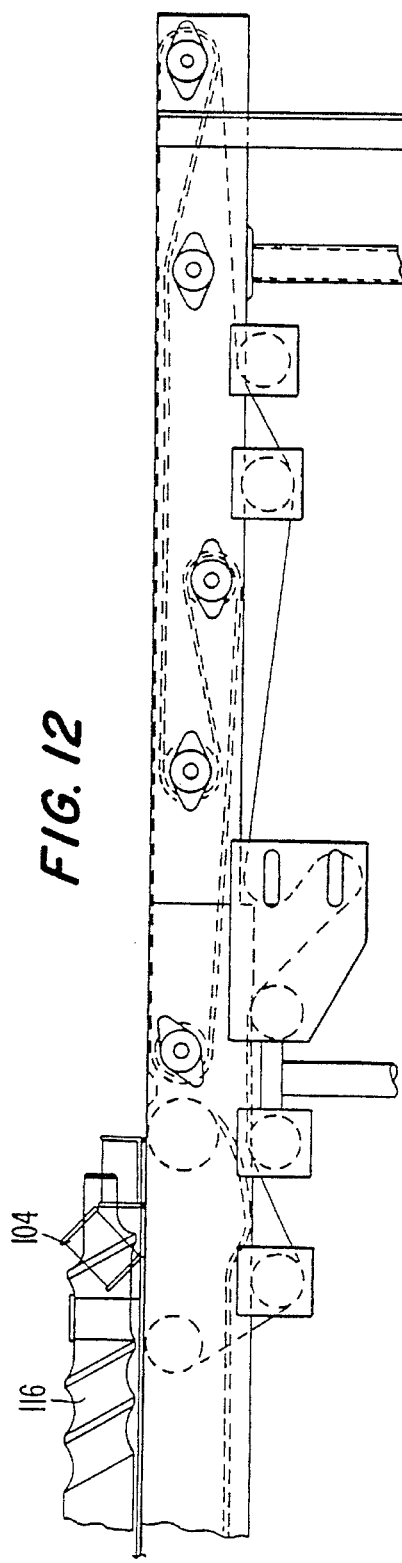
FIG. 12 is a side elevational view of the conveyor of FIG. 11.
Figure 13:
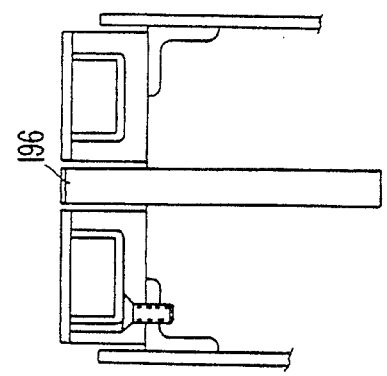
FIG. 13 is an enlarged elevational view of the right end of the conveyor of FIGS. 11 and 12.

In lieu of the multiplicity of pulleys driving the transfer belt 196 as shown in FIGS. 12 and 13, a preferred, simpler pulley arrangement of this invention is shown in FIG. 10 generally at 210. In this pulley arrangement 210, the drive pulley 212 (or extension head pulley 200) is shown at the front or the right of this figure, a pair of vertically arranged takeout pulleys 214, 216 are shown generally in the middle and idler pulleys 218, 220 are shown, respectively, on the left and between the takeup and drive pulleys.

With each revolution of the screws 114, 116 a single can 104 disposed between them is toppled completely forward. Thus with twenty rotations of the screws 114, 116 and with twenty cans available in the feed area immediately before the screws, exactly twenty cans will be quickly toppled forward into a can stick. It is desirable to provide a full count of cans, that is, a full stick of cans, for each loading of the carrier 108, to provide for efficient, maximum utilization of the large hydrostatic sterilizer 110. Thus, the present system includes a sensor 224 that generally will not let the screws 114, 116 turn unless there is a ready supply of twenty cans. Since four cans will be in the pitches of the stopped screw device, as can be understood from FIG. 3, the sensor 224 is located at the location of the twenty-fourth can, which location depends on the diameters of the cans behind the infeed to the screws. When a different size can is to be sterilized, the guide rails 176 are adjusted (extended for larger packages) and the sensor 224 is moved with them. The sensor 224 can be a "Seeing Eye Dog" type of sensor—a photosensor—, for example. The sensor 224 also can be used to help prevent straggler cans from entering the rotating screws 114, 116 and thereby jamming the screws and/or denting the cans, as explained below. Referring to FIG. 7, the count sensor 225 counts the rotations of the screws.

Sometimes though more than one and less than twenty (or a complete "stick") cans may be waiting at the infeed end of the screw device 102. If they wait too long to be toppled and fed into the hydrostatic sterilizer 110, the contents of the cans can cool off to an unacceptable degree. Thus, the present invention uniquely provides for the activation of the screw device 102 after a certain period of time has passed equalling at least the passage of one empty carrier (108), and before the full complement of twenty cans is available. This activation is initiated by a timer which is set, for example, at thirty seconds. The timer can be a latch-activated timer in the logic control program of the PLC (236), for example. If the full complement of twenty cans is not detected by the sensor 224, the screws 114, 116 have not been activated or fired and this time period has passed, then a can stop 230 is energized with the passage of the next conveyor carder as detected by the carrier pulse sensor 232 (FIG. 7). The can stop 230 closes off the conveyor 178 to the infeed of additional cans so that no additional cans can reach the screw device 102. Then at the next available carrier (108) the screws 114, 116 are activated to lay down and kick the cans which are present at the feed area into the carrier.

This can stop 230, which prevents straggler cans from entering the spinning screws 114, 116, can be a prior art type of can stop comprising a magnetic coil which when energized by the induction of a current causes a can stop arm having a roller at its tip to extend out over the conveyor 176 and block the passage of further cans to the screw device 102. When the coil is later deenergized, the arm moves back, under a spring load, and out of the path of the cans to the screw device 102. In other words and referring to FIG. 7, for example, the sensor 224 senses the cans for a full stick, and the carrier location for can deposit is identified by the carrier pulse sensor 232. The sensor 224 must be made for one second to allow screw operation with the carder pulse sensor 232. The can stop 230 then energizes if the sensor 224 does not "see" cans for thirty seconds. And the screws 114, 116 are operated at the next carrier pulse, as determined by the carrier pulse sensor 232, to deposit idle cans into the sterilizer 110. The can stop 230 thus prevents random cans from entering the screws 114, 116 while they are operating. All electrical signals of this system pass through the programmable logic control (PLC) control 236 to coordinate these operations.

The operation of the kicking assembly 106 of the present invention can be understood by reference to FIGS. 27–29. It is seen therein that two operations are being performed on the stick of cans 104, the cans being illustrated in end view. One operation is the kicking or rolling of the cans from and off the conveyor belt 180 and down into the carrier bars 108 of the hydrostatic sterilizer 110. In other words, the stick of cans is kicked by the kicker plate 240 to the fight as depicted in FIGS. 28 and 29. As the cans are being kicked or rolled, they are simultaneously being clamped or squeezed. This clamping action is released just prior to the completion of the kicking motion so as to release the cans 104 and allow them to be rolled off the conveyor belt 180. While FIG. 28 best shows the start of the kicking process as well as the start of the clamping process, FIG. 29 best shows the release of the clamping action and the subsequent kicking or rolling of the stick of cans. As the cans are being formed in a stick and positioned at the kicker plate 240, they are banging into each other and being moved back and forth, tending to stand up instead of rolling into the carriers and thereby tending to damage the can and/or jam the machine. The present squeezing or clamping operation eliminates this can standing problem.

The cans are gripped directly by a clamp gripper member 242 which is made of a urethane/rubber material. This gripper member 242 is mounted in a material support track 244 which in turn is secured (by bolts 245 (FIGS. 18 and 19)) to a face of the angled clamp arm 246. The upper end of the clamp arm 246 in turn is secured by bolt 248 to a face of a knuckle 250. A pneumatic cylinder 252 has at its end an eyelet connection 254 through which a bolt 256 secured to the knuckle 250 passes. Thus, when the piston of cylinder 252 is extended, the plate 240, through the knuckle 250, is pushed to the right as shown in these figures and pivots about the bushing 260, shown in FIGS. 27 and 28, to a clamped position. When the piston is then retracted or the pneumatic pressure on it released, the clamp gripper member 242 and the clamp arm 246 are pivoted about the bushing as shown by the arrow in FIG. 29 in a counter-clockwise motion away from the can. The pneumatic cylinder 252 is mounted to and generally above the frame 262 by brackets 261a, 261b.

Figure 20:
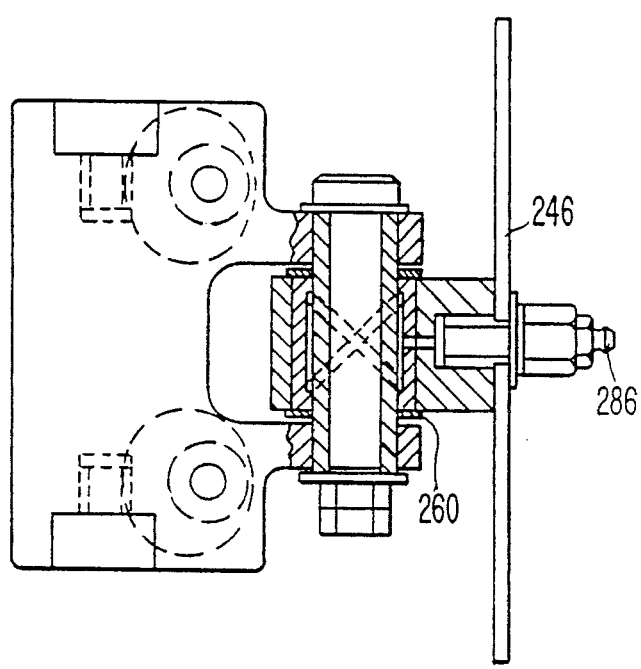
FIG. 20 is a cross-sectional view taken on line 20—20 of FIG. 19.

Both the kicking and the clamping assemblies are fixed to and pivotal about the frame 262. The vibration of their motion is dampened by the bumper 264 shown in the lower left corner of the figures which engages the piston support 266. The kicking process is controlled and actuated by the cylinder 268 which is pivotal about its eyelet 270, which in turn is mounted to the sterilizer frame. The pivot arm 272 is pivotally connected at one end to the piston end 274 and at its opposite end to the frame 262. As the piston 274 is actuated it causes the end of the arm 272 to pivot about the pivot member 276. The end of the arm 272 in turn is attached to one leg 278 of the angled kicker frame or angled plate 240, and the other leg 282, which is angled with respect to the one leg, then pushes against the stick of cans. As can be understood from a comparison of FIGS. 28 and 29, the clamping mechanism (246) also pivots when the kicker member (282) is pivoted and the clamping member itself is also pivotable about its pivot point 260 by the pneumatic cylinder 252. The pivot 260 can be kept lubricated through the grease fitting 286 (FIGS. 18–20). Additionally, the height of the kicker frame can be adjusted using the height adjustment slotted member 288 relative to the fixed frame 262 to accommodate different diameter cans.

Thus, the clamp kicker device 106 gently squeezes the can 104 immediately prior to and/or at the beginning of the kicking motion of the can. This squeezing eliminates the previously-experienced undesirable backward and forward motion of the cans. At high feed speeds, on the order of six hundred cans per minute, the cans never completely stop. They are banging into one another so fast that the present kicking assembly literally throws them out on their side. Referring to FIGS. 16 and 18, four of these kicking assemblies 106 (namely, 106a, 106b, 106c and 106d) can be used on the conveyor belt and for a stick of twenty cans, mounted on the same frame 262 (FIGS. 22 and 23) and with the same elongate clamping arm or member 246 (FIG. 24). It is also within the scope of the invention to use two or other numbers of such assemblies as may be needed.

Figure 31:
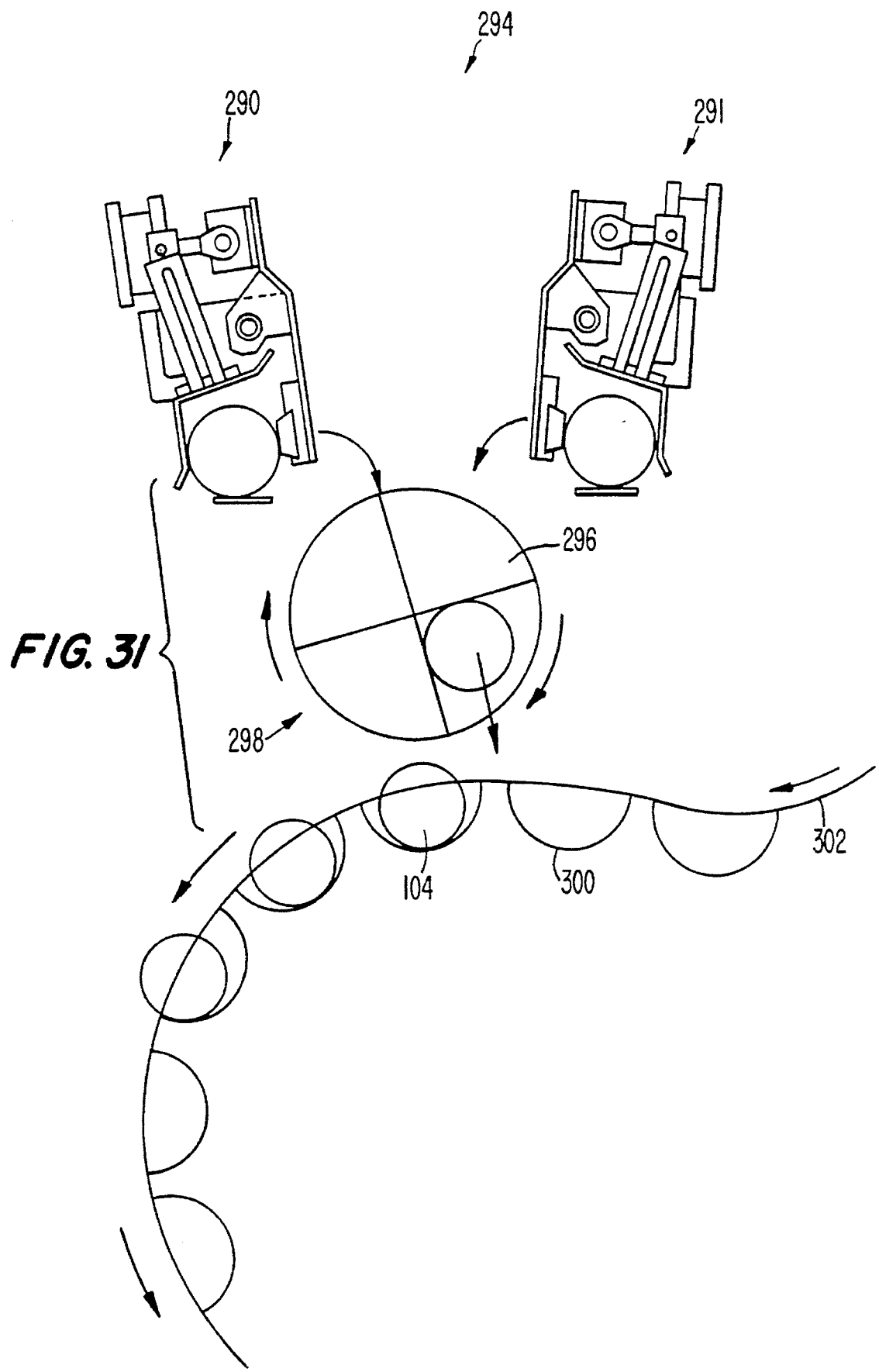
FIG. 31 is an enlarged cross-sectional view taken on line 31—31 of FIG. 30, illustrating in greater detail the carder deposit system thereof.

A pair of kicker-clamp assemblies 290, 291 can be provided spaced, facing each other and alternatingly feeding sticks of cans to the carrier between them. Each of these assemblies, similar to the one-side infeed, has its center 292 (FIG. 27) angling inwardly at an angle 293 of about fifteen degrees providing the least mount of stroke, completing in the shortest mount of time. This two-side infeed improves feed speeds over a one-side infeed by approximately seventy percent and is also advantageous over the one-side infeed in that it allows twice the loading time. This two-side infeed is shown in FIG. 31 generally at 294 wherein the kicker/clamp assemblies 290, 291 feed into alternating pockets 296 of a four-pocket rotating drum 298. The drum 298 as it rotates deposits the can sticks into the carriers 300 of the carder chain 302. In lieu of the rotating drum 298 a pivoting trough can be used as shown in FIG. 32 generally at 304.

A screw assembly 102a, 102b is provided for each of the kicker/clamp assemblies 106a, 106b as depicted in FIG. 30, each screw assembly being driven by a different AC frequency controlled motor (120). A single conveyor feed 306 leaves the filler and closure equipment 100 and the cans from this feed are divided into two conveyor feed 308, 310 lanes by a divider system shown generally at 312. The divider system 312 can be a mass diverter table or a diverter screw assembly. The former includes various belts running at different speeds and dividing the cans into two lines. The latter includes a pair of diverter screws which split the single lane backlog flow of cans into two lanes. While the screw assembly guarantees an equal split of cans to the two lanes, the diverter table does not. The operation of the diverter screw assembly (312) must be timed (through the PLC control 236) to that of the toppling screw devices 102a, 102b, since if there is a backlog of cans in the diverter screw assembly and it is kept running, it will chew the cans up. On the other hand, the diverter table can be kept running and its conveyors simply slip under the waiting cans. A single can stop 316 is provided on the infeed side of the divider screws instead of a pair of stops provided on the discharge side since it divides the cans equally. Inwardly curving cross-over conveyors 318, 320 from the screw devices 102a, 102b to the kicker/clamp assemblies 106a, 106b, respectively, are needed due to the space required for dual side-by-side units. With the system of FIG. 30 a reliable feed rate of eight hundred cans per minute is possible as compared with an unreliable maximum rate of seven hundred and sixty cans per minute which was possible in the past.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A system for kicking containers comprising:
    a support surface disposed to support a plurality of containers;
    a kicker assembly pivotable about a first axis to kick the containers laterally off of said surface; and
    a clamp assembly pivotable about a second axis to clamp the containers against said kicker assembly said second axis displaced from said first axis; said clamp assembly also pivotable about the first axis.

2. The system recited in claim 1, further comprising a first cylinder and first piston, said clamp assembly linked to said first piston such that movement of said first piston causes said clamp assembly to pivot about said second axis.

3. The system recited in claim 2, further comprising:
    a frame, said kicker assembly linked to and pivotable about said frame, said frame including the first axis;
    a second cylinder and a second piston; and
    a pivot arm pivotably connected at a first end to said second piston and linked at a second end to said kicker assembly, movement of said second piston causing said kicker assembly to pivot about said frame and thereby kick said containers off of said surface.

4. The system recited in claim 3, wherein, said first cylinder is fixed to and pivotable about said frame, wherein, movement of said second piston causes said first cylinder, said first piston and said clamp assembly to pivot about said frame simultaneously with said kicker assembly.

5. The system recited in claim 3, said kicker assembly comprising a first leg and a second leg disposed at an angle to said first leg.

6. The system recited in claim 3, said clamp assembly comprising a clamp arm, a support track mounted on said clamp arm, and a gripper member mounted on said support track.

7. The system recited in claim 3 further comprising means for adjusting the height of said kicker assembly relative to said frame.

8. The system recited in claim 7, said means for adjusting comprising a slotted member fixed to said frame.

9. The system recited in claims 3 further comprising means for damping vibration of said kicker assembly and said clamping assembly.

10. The system recited in claim 2 further comprising a belt conveyor, said belt conveyor including said support surface.

11. An assembly for feeding rows of end-to-end cylindrical containers into a laterally adjacent carrier, said assembly comprising:
    pushing means for pushing a plurality of end-to-end cylindrical containers laterally towards an adjacent carrier;
    clamping means for clamping the containers to thereby restrain longitudinal movement thereof as they are being pushed towards the carrier by said pushing means and for releasing them just prior to the completion of the pushing action of said pushing means to allow the containers to roll into the carrier; and
    a frame;
    said pushing means comprises:
        a kicker assembly linked to and pivotable about said frame;
        a first cylinder and a first piston; and
        a pivot arm pivotably connected at a first end to said first piston and linked at a second end to said kicker assembly, movement of said first piston causing said kicker assembly to pivot about said frame thereby kick said containers into the carrier, and wherein;
    said clamping means comprises:
        a clamp assembly and
        a second cylinder and a second piston, said clamp assembly linked to said second piston such that movement of said second piston causes said clamp assembly to pivot towards or away from said pushing means.

12. A container stick kicking system comprising:
    a container stick support surface;
    a clamper;
    a first fluid cylinder operatively connected to said clamper to operate relative to containers on said support surface to reduce longitudinal back-and-forth motion thereof;
    a kicker; and
    a second fluid cylinder operatively connected to said kicker to kick the containers of the stick on said support surface laterally off of said support surface.

13. The system recited in claim 12 further comprising a frame, said kicker and said clamper linked to and pivotable about said frame.

14. The system recited in claim 13, further comprising a pivot arm pivotably connected at a first end to a piston of said second fluid cylinder and linked at a second end to said kicker, movement of said piston causing said kicker and said clamper to pivot about said frame.

15. A method for loading sticks of containers onto carriers, said method comprising:
    feeding a plurality of containers longitudinally to a container stick location;
    pushing the containers laterally from the location and onto a carrier by a pusher member; and
    during said pushing step, applying lateral pressure to the containers by clamping the containers between a clamping member and said pusher member to restrain back-and-forth longitudinal movement of the containers and prior to completion of said pushing step, releasing the lateral pressure.

16. The method of claim 15, wherein said applying lateral pressure step and said releasing lateral pressure step include pivotally displacing said clamping member with respect to said pusher member.

17. A system for kicking containers comprising:
    a support surface disposed to support a plurality of containers;
    a frame,
    a kicker assembly for kicking the containers laterally off of said surface, said kicker assembly linked to and pivotable about said frame, said kicker assembly including a kicker member for contacting said containers and kicking the containers laterally off of said surface;

a clamp assembly to clamp the containers against said kicker assembly, said clamp assembly including a clamping member for clamping the containers against said kicker member, said clamping member pivotable with respect to said kicker member;

a first device, said first device imparting relative pivotal movement between the kicker member and the clamping member; and a second device, said second device simultaneously imparting pivotal movement between the kicker and clamping members with respect to said frame.

18. The system recited in claim 17, said first device including a piston and cylinder assembly, a first end of said piston and cylinder assembly attached to one of said kicker assembly and said clamp assembly, and a second end of said piston and cylinder assembly attached to the other one of said kicker assembly and said clamp assembly.

19. The system recited in claim 17, said clamp assembly further including a clamp arm and a support track mounted on said clamp arm, said clamping member adjustably mounted on said support track.

20. The system recited in claim 17, said second device including a piston and cylinder assembly, and a pivot arm attached to said kicker assembly, a first end of said piston and cylinder assembly attached to one of said frame and said pivot arm, and a second end of said piston and cylinder assembly attached to the other one of said frame and said pivot arm.

* * * * *

UNITED STATES PATENT AND TRADEMARK OFFICE
CERTIFICATE OF CORRECTION

PATENT NO. : 5,454,465

DATED : October 3, 1995

INVENTOR(S) : John Baranowski

It is certified that error appears in the above-identified patent and that said Letters Patent is hereby corrected as shown below:

Column 13, line 26, insert --,-- after assembly;

Column 13, line 60, "claims" should be replaced by --claim--.

Signed and Sealed this

Twenty-eighth Day of November 1995

*Attest:*

BRUCE LEHMAN

*Attesting Officer*     *Commissioner of Patents and Trademarks*